(12) United States Patent
Suzuki et al.

(10) Patent No.: US 7,821,891 B2
(45) Date of Patent: Oct. 26, 2010

(54) OPTICAL DISC APPARATUS AND METHOD OF WRITING INFORMATION TO AN OPTICAL DISC INCLUDING CORRECTING WRITE STRATEGY

(75) Inventors: Toshiaki Suzuki, Yokohama (JP); Yukihisa Nakajo, Yokohama (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 947 days.

(21) Appl. No.: 11/656,452

(22) Filed: Jan. 23, 2007

(65) Prior Publication Data

US 2007/0217306 A1    Sep. 20, 2007

(30) Foreign Application Priority Data

Jan. 25, 2006   (JP)   .............................. 2006-016663

(51) Int. Cl.
    *G11B 15/52*  (2006.01)
(52) U.S. Cl. .................................. 369/47.53; 369/53.27
(58) Field of Classification Search ....................... None
    See application file for complete search history.

(56) References Cited

U.S. PATENT DOCUMENTS

| 7,224,660 B2 | 5/2007 | Nakajo |
| 2002/0136121 A1 * | 9/2002 | Salmonsen et al. ........ 369/47.53 |
| 2005/0052975 A1 | 3/2005 | Banno |
| 2005/0078578 A1 | 4/2005 | Sasaki |
| 2005/0099925 A1 | 5/2005 | Nakajo |
| 2005/0207298 A1 | 9/2005 | Seino |
| 2007/0047407 A1 * | 3/2007 | Chang et al. ............. 369/47.53 |

FOREIGN PATENT DOCUMENTS

| JP | 2003-168216 A | 6/2003 |
| JP | 2004-139658 | 5/2004 |
| JP | 2005-071470 | 3/2005 |
| JP | 2005-135481 A | 5/2005 |
| JP | 2005-149580 | 6/2005 |
| JP | 2005-149580 A | 6/2005 |
| JP | 2005-267801 | 9/2005 |
| JP | 2006-253587 | 9/2006 |

* cited by examiner

*Primary Examiner*—Paul Huber
(74) *Attorney, Agent, or Firm*—Lee & Morse, P.C.

(57) ABSTRACT

An optical disc apparatus may write information to an optical disc by forming a mark and a space on the optical disc. The optical disc apparatus may include a write stopping unit, a deviation calculating unit, and a write strategy correction unit. The write stopping unit may temporarily stop writing of information to the optical disc at a predetermined time. The deviation calculating unit may obtain a deviation value of written information just before writing of information is stopped by the write stopping unit. The write strategy correcting unit may correct a write strategy based on the deviation and the previously-stored inherent variation. Writing of information to the optical disc may be restarted using the corrected write strategy.

11 Claims, 6 Drawing Sheets

OPTICAL DISC APPARATUS AND METHOD OF WRITING INFORMATION TO AN OPTICAL DISC INCLUDING CORRECTING WRITE STRATEGY

BACKGROUND OF THE INVENTION

1. Field of the Invention

The present invention relates to an optical disc apparatus. More particularly, the present invention relates to an optical disc apparatus capable of writing and reproducing information to and from an optical disc, and a method of writing information to the optical disc.

2. Description of the Related Art

Optical disks may generally be used as recording media for storing digital information, e.g., data, audio and video. Optical disks may be classified into postscript type optical disks, e.g., compact disc-read only (CD-R), rewrite type optical disks, e.g., CD-RW (read and write), and bulk optical disks, e.g., digital versatile disc (DVD)-R, DVD±R, DVD±RW, and DVD±RAM (random access memory). Current trends include miniaturizing a spot diameter using a high numerical aperture (NA) object lens, using increasingly shorter wavelength light sources, e.g., a semiconductor laser, and using a thin printed circuit board (PCB), which may increase storage capacity of the optical disks and/or decrease optical disk drive size.

Information may be recorded on such an optical disk using a light source, e.g., a laser diode. However, an optimum write parameter may change due to a characteristic of the optical disk and compatibility with an optical disk apparatus. For common optical disks, an optimum write process may be performed by storing write parameters of the common optical disks in firmware of an optical disk apparatus and reading the stored write parameters when information is recorded. That is, when an optical disk is inserted into an optical disk apparatus, unique information, e.g., a disk identifier (ID), etc., of the optical disk may be read, and then a write operation for recording information may be performed by specifying a maker and a model of the optical disk based on the read unique information. Write parameters (hereinafter, referred to as write strategies) may include a pulse width, a change position (speed), a write power of a light source, and a target β.

However, various kinds of optical disks in addition to common optical disks are available on the market. Furthermore, in view of the development of new optical disks, it is impractical to set optimum write strategies for all optical disks available on the market. Thus, for unknown optical disks, i.e., those whose write strategies are not stored in firmware, a write operation may be performed using a standard write strategy or a write strategy of an optical disk having a similar characteristic, e.g., a write strategy of an optical disk of the same maker.

Recently, the amount of data handled by users has increased significantly. Write time is proportional to the amount of information recorded. Thus, in addition to obtaining a desired write quality, a reduced write time, e.g., by realizing a high-speed write operation, may be demanded.

Thus, optical disk makers develop optical disks suitable for high-speed recording, and optical disk apparatus makers develop optical disk apparatuses capable of high-speed recording. In detail, optical disk apparatuses may realize high-speed recording using, e.g., a constant angular velocity (CAV) method or a partial constant angular velocity (PCAV) method.

Moreover, even for common optical disks, previously stored write parameters may not be optimal, e.g., due to differences between optical disk apparatuses, individual differences between the optical disks and/or operational environments. Therefore, when a write command is received by an optical disk apparatus, e.g., from a personal computer (PC), the optical disk apparatus may perform an optimum power control (OPC) to determine the optimum write power of a light source performing a write operation.

According to the OPC, test recording may be performed in an OPC-exclusive test area using previously stored write strategies, and whether a selected write strategy is appropriate from recorded data may be determined. If the selected write strategy is appropriate, user data may be recorded in a user data area based on the selected write strategy. If the selected write strategy is not appropriate, the write power of a light source may be determined based on a compensated write strategy, and then the data may be recorded in the user data area.

Based on the result of the OPC operation, a write operation of correcting a write strategy and writing information using the proper write strategy may be performed. Here, when a linear velocity at which a write operation is performed is gradually increased, as in a CAV or PCAV write technique, a write strategy originally stored cannot be applied without being altered. As such, the write operation may be performed by updating a write strategy stepwise according to a change in speed, as illustrated in FIG. 9.

In the conventional optical disc apparatus, it may be necessary to adjust an optimum write strategy even for a well-known optical disc. Here, write strategy adjustment may include adjustment of a pulse width, a change position (speed), a write power of a light source and/or a target β. The write strategy adjustment must be performed manually, e.g., whenever a new type of an optical disc is produced, and another write strategy adjustment may be needed whenever there is a change of a write speed, so frequent adjustments may be required to realize an appropriate write strategy.

In addition, as the capacity of well-known optical discs continues to increase, storage capacity for storing write strategy information also increases. In addition, since a write strategy may be changed by an entity error of the optical disc, an instrument error of the optical disc apparatus or an operating environment (temperature, etc.), a write strategy stored in firmware may not necessarily be appropriate. In particular, when a write strategy is greatly corrected during the OPC operation, a subsequent write strategy may not be appropriate, which may cause a write quality to deteriorate.

SUMMARY OF THE INVENTION

The present invention is therefore directed to an optical disk method and apparatus, which overcome one or more of the above disadvantages of the related art.

It is therefore a feature of an embodiment of the present invention to provide an optical disc apparatus and method that reduces a number of times write strategies need to be adjusted.

It is therefore another feature of an embodiment of the present invention to provide an optical disc apparatus and method that reduces a memory capacity needed to store write strategies.

It is therefore yet another feature of an embodiment of the present invention to provide an optical disc apparatus and method that maintains a stable write quality without being effected, e.g., by an entity error of an optical disc, an instrument error of the optical disc apparatus or an operating environment.

At least one of the above and other features and advantages of the present invention may be realized by providing an optical disc apparatus for writing information to an optical disc by forming a mark and a space on the optical disc, the optical disc apparatus including a write stopping unit for temporarily stopping writing of information to the optical disc at a predetermined time, a deviation calculating unit for obtaining a deviation value of written information just before writing of information is stopped by the write stopping unit, and a write strategy correcting unit correcting a write strategy based on the deviation and a previously-stored inherent variation, wherein writing of information to the optical disc restarts using the corrected write strategy.

The predetermined time may be determined based on a change of a write speed. The correcting of the write strategy may be performed a plurality of times from write start to write end. Times in the plurality of times may be evenly spaced, may be spaced by an integer multiple of a minimum resolving power and/or may be unevenly spaced.

The optical disc apparatus may further include a memory unit storing a reference write strategy and the inherent variation. An optimum reference write strategy on the optical disc, to which information is written, may be selected and a write attempt may be made in a test region of the optical disc. The deviation calculating unit may calculate a deviation value of the result of the write attempt, and the write strategy correcting unit may correct a write strategy based on the calculated deviation value and the inherent variation. Writing according to the corrected write strategy to the optical disc may be performed after the correction is performed. Whether a test region is in an inner circumference test region or an outer circumference test region may be determined according to a write start position from which a write operation starts.

At least one of the above and other features and advantages of the present invention may be realized by providing a method for writing information to an optical disc by forming a mark and a space on the optical disc, the method including performing a write operation using a reference write strategy in a test region of the optical disc before information is written to the optical disc, reproducing the written signal and correcting the reference write strategy, writing information to the optical disc using the corrected write strategy, when a write strategy position changes, temporarily stopping writing of information and optimizing the write strategy, and restarting writing of information using the optimized write strategy.

The method may be applied to a writing method by which a write speed changes continuously.

The optimizing of the write strategy may include reproducing written information just before the change position is formed, and obtaining a deviation value by optimizing the write strategy based on the obtained deviation value and previously-stored inherent variation.

At least one of the above and other features and advantages of the present invention may be realized by providing an article of manufacture having a machine-accessible medium including data that, when accessed by a machine, cause the machine to perform a method of correcting a write strategy for writing to an optical disk, the method including performing a write operation using a reference write strategy in a test region of the optical disc before information is written to the optical disc, reproducing the written signal and correcting the reference write strategy, writing information to the optical disc using the corrected write strategy, when a write strategy position changes, temporarily stopping writing of information and optimizing the write strategy, and restarting writing of information using the optimized write strategy.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
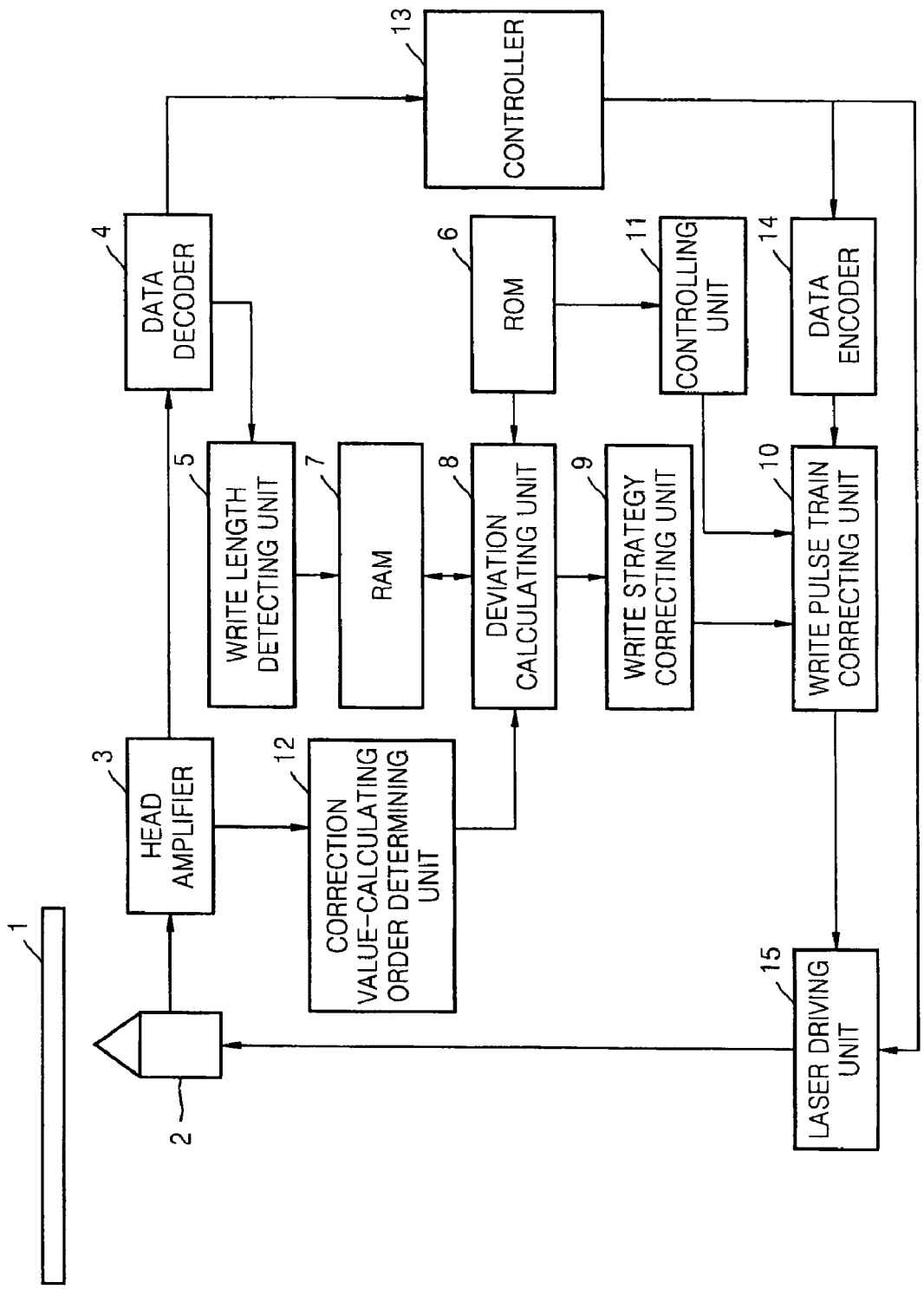
FIG. 1 illustrates a block diagram of an optical disc apparatus according to an embodiment of the present invention.

Japanese Patent Application No. 2006-0016663, filed on Jan. 25, 2006, in the Japanese Patent Office, and entitled: "Optical Disc Apparatus and Method for Writing Information Thereof," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 illustrates a block diagram of an optical disc apparatus according to an embodiment of the present invention. Referring to FIG. 1, an optical disk 1 used in the optical disc apparatus may be a recording medium, e.g., CD-R, CD-RW, DVD±R, DVD-RW, DVD-RAM, etc., on which recording, reproducing, and erasing (only for RW and RAM) of information may be performed using a light source, e.g., a semiconductor laser.

As shown in FIG. 1, the optical disc apparatus may include an optical pick-up 2, a head amplifier 3, a data decoder 4, a write length detecting unit 5, Read Only Memory (ROM) 6, Random Access Memory (RAM) 7, a deviation calculating unit 8, a write strategy correcting unit 9, a write pulse train correcting unit 10, a controlling unit 11, a correction value-calculating order determining unit 12, a controller 13, a data encoder 14, and a laser driving unit 15.

The optical pickup 2 may scan a laser beam on the recording surface of the optical disk 1, on which tracks are formed, and may simultaneously receive light reflected from the recording surface. Components of the optical pickup 2 are not shown for clarity of explanation. The optical pickup 2 may include a light source, e.g., a laser diode, a collimating lens, an objective lens, which may be driven by a focusing actuator or a tracking actuator, a polarization beam splitter, a cylindrical lens, and a photo detector (PD), which may be divided into a plurality of regions, e.g., two or four, e.g., A, B, C, and D, and may convert light into an electric signal. The optical pick-up 2 may include a monitor diode that monitors power of light output from the light source during writing and reproducing operations.

The head amplifier 3 may generate an RF signal indicating the sum of reflected light intensity per area of the PD, a focus error signal indicating a focus mismatch of the light source of the optical pickup unit 2 using, e.g., an astigmatism method, and a tracking error signal indicating a track mismatch of the light source of the optical pickup unit 2 using, e.g., a pushpull method. The head amplifier 3 may also measure a jitter value of the generated RF signal and detect asymmetry from the RF signal.

The data decoder 4 may generate an eight to fourteen modulation (EFM) signal from the RF signal generated in the head amplifier 3, may convert the EFM signal into a signal having a desired format, and may output the signal to a controller 13.

The write length detecting unit 5 may receive the EFM signal from the data decoder 4, and may measure a pulse width of the EFM signal using a time measuring circuit (not shown).

The ROM 6 may store a control program for controlling the optical disc apparatus, a reference write strategy, a theoretical length of each mark and space, or a probability of existence of each mark length and space length combination.

The RAM may 7 may temporarily store an amount of correction in each optical disc, the measurement value of a write length from the write length detecting unit 5, a deviation value between a theoretical length of each mark and space and the measured value, an amount of expansion and contraction of each mark and space, or a measured jitter value. That is, the measurement result of the write length, when information written just before a change position that will be described later is formed is reproduced, may be written to the RAM 7.

The deviation calculating unit 8 may calculate a deviation value by comparing the measurement value of the write length stored in the RAM 7, a deviation value of a theoretical length between each mark and space, and the previous result of calculating a deviation value.

The write strategy correcting unit 9 may calculate a correction value of a reference write strategy or a write strategy applied just before the change position, so that all deviation values between all marks and spaces calculated by the deviation calculating unit 8 may be within a predetermined range, based on the amount of expansion and contraction of all marks and spaces stored in the RAM 7 and the probability of existence stored in the ROM 6.

The write pulse train correcting unit 10 may receive a correction value from the write strategy correcting unit 9, and may correct a write pulse train to be an optimum write pulse train in the optical disc 1 based on the received correction value.

The controlling unit 11 may control the optical disc apparatus to write and reproduce information to and from the optical disc 1 according to a control program. In addition, the controlling unit 11 may perform a write operation in a test region of the optical disc 1 using the reference write strategy written to the ROM 6, e.g., using a constant linear velocity (CLV) technique, and then may correct a write strategy using an auto write strategy (AWS) technique.

In addition, the controlling unit 11 may temporarily stop writing information to the optical disc 1 at a predetermined time. A deviation value of information written just before stopping may be calculated by the deviation calculating unit 8, a write strategy may be corrected by the write strategy correcting unit 9, and write processing may restart with the corrected write strategy.

The correction value-calculating order determining unit 12 may determine the order for calculating the amount of expansion and contraction of all marks and spaces corresponding to respective setting parameters based on deviation values before and after each edge when information is written with the reference write strategy and jitter values of signals written by changing the respective setting parameters.

The controller 13 may supply a write signal to a data encoder 14 and may read the write signal from the data decoder 4.

The data encoder 14 may convert the write signal from the controller 13 into an EFM signal, and may output the converted signal to the write pulse train correcting unit 10.

The laser driving unit 15 may generate a pulse signal for driving the laser diode in accordance with the input write pulse, and may supply the pulse signal to a laser diode in the optical pickup 2.

As described above, in an embodiment of the present invention, re-evaluation of a write strategy may be performed using AWS even during a write operation. Meanwhile, details related to AWS are described in Japanese Patent Laid-open Publication No. 2005-149580, on which U.S. patent application Ser. No. 2005-0099925 is based, both of which are hereby incorporated by reference in their entirety, and thus, a repeated description thereof will be omitted.

Figure 2:
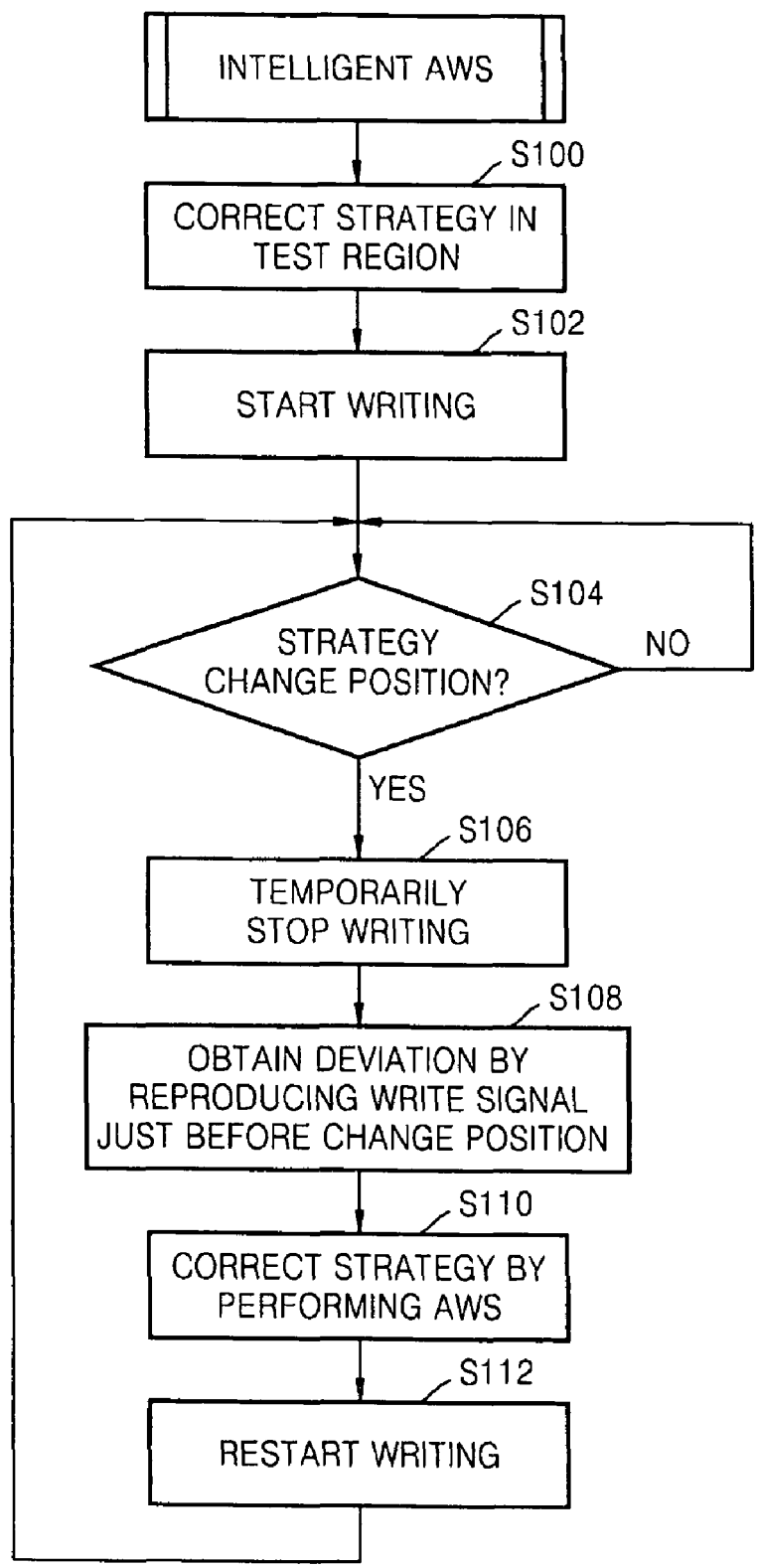
FIG. 2 illustrates a flowchart of a method for writing information of an optical disc apparatus according to an embodiment of the present invention.

The operating flow of intelligent AWS in a method for writing information of the optical disc apparatus according to an embodiment of the present invention will now be described with reference to FIG. 2. An operation of the optical disc apparatus will now be described with reference to FIGS. 1 and 2.

When the optical disc 1 is inserted in the optical disc apparatus, and there is a request for writing of information to the optical disc 1 from a PC (not shown), the controlling unit 11 may send the reference write strategy stored in the ROM 6 in the write pulse train correcting unit 10, and may perform writing of predetermined information in the test region of the optical disc 1 using, e.g., CAV. If the write operation in the test region is terminated, AWS may be performed to correct a write strategy, and write strategy information for writing actual information may be determined in operation 100.

A basic formula of AWS is X=D/a, where X is a strategy correction amount, D is a deviation, and a is an inherent variation (variation of a mark and a space when the mark and the space are changed by a minimum resolving power of a write pulse).

As described above, the deviation may be obtained by the deviation calculating unit 8, and the inherent variation may be measured using a mark and a space written with the reference write strategy.

However, when the inherent variation is obtained each time that a user measures the inherent variation, a write operation and a reproduction operation may be performed at least twice with different strategies, and a difference in deviations may be obtained. Thus, more of the test region of the optical disc may be used, time required for setting write strategies may increase and measurement error may increase. In addition, when thermal interference deformation occurs, write strategies may be corrected inaccurately.

Thus, in the present embodiment, except for a method for measuring the inherent variation, a method by which the inherent variation is used by previously storing values determined according to the type of an optical disc, a write speed and setting of an RF signal equalizer in a predetermined storage unit. In this case, the inherent variation may be determined statistically as optimum values according to respective settings. The inherent variation may be previously stored in the ROM 6, and may also be previously stored in each optical disc and may be read by the optical disc apparatus.

An operation of setting write strategies when the inherent variation is previously stored in the ROM 6 will now be briefly described.

The controlling unit 11 may read disc ID from the optical disc, set a write speed, and read an inherent variation that coincides with the type of the optical disc and the write speed from the ROM 6. The controlling unit 11 may perform a test write operation in a test region of the optical disc with a reference write strategy, and may set an optimum write strategy using the result of the test write operation and the inherent variation stored in the ROM 6.

The inherent variation may be previously stored and write strategies may be set so that the effect of an error caused by measurement may be confined to an error caused by a deviation, and measurement errors may be reduced. Thus, the effect of thermal interference deformation may be reduced, and an optimum strategy may be calculated by performing a write operation once.

In addition, a test region to be used may be in an inner circumference region or an outer circumference region, according to a write start position (speed). As an example, if a CAV limit speed of the inner circumference test region of the optical disc 1 is a 20-speed rating, and the write start speed is less than a 20-speed rating, the inner circumference test region may be used, and if the write start speed is greater than 20-speed rating, the outer circumference test region may be used.

If write strategy information during a write operation is determined in operation S100, the controlling unit 11 may start writing information using CAV writing in operation S102.

After that, the controlling unit 11 may determine whether or not the optical disc apparatus reaches a write strategy change position (speed) in operation S104. That is, since, when information is written to the optical disc 1, a write speed becomes faster approaching an outer circumference of the optical disc 1 from an inner circumference thereof, write quality may gradually deteriorate when a write operation is performed using the same write strategy information for the entire optical disc 1. Thus, the controlling unit 11 may temporarily stop the write operation for optimizing write strategies at each predetermined speed in operation S106. The controlling unit 11 may obtain (calculate) a deviation by reproducing a write signal just before the write strategy change position in which the write operation is stopped in operation S108, and write strategies may be corrected using AWS in operation S110.

Specifically, the controlling unit 11 may reproduce the write signal just before the write strategy change position, and the write length detecting unit 5 may measure a write length in combination of all marks and spaces, and the measurement result may be stored in the RAM 7 for each write strategy. The deviation calculating unit 8 may calculate a deviation between a write length at a write strategy just before the change position stored in the RAM 7 and a theoretical length in combination of all marks and spaces stored in the ROM 6, a deviation between a write length at a write strategy in which the predetermined marks and spaces are increased by an integer multiple of a minimum resolving power and a theoretical length in combination of all marks and spaces stored in the ROM 6, and a deviation value between both the deviations. The write strategy correcting unit 9 may calculate an inherent variation of each mark and space from the calculated deviation value using the above-described probability of existence of each mark and space combination.

Once the inherent variation of each mark and space is calculated, a write operation may restart using the optimized write strategy in operation S112. Subsequently, the controlling unit 11 may repeat operations S106 through S112 at each write strategy change position (speed).

In the present embodiment, the write strategy may be optimized using AWS based on a write power Pw of a light source and a reference write strategy. The write power Pw of the light source may be represented as Pw=a×V+b, where is a write speed, and a, b are coefficients determined for each optical disc. Thus, since write strategy information does not need to be adjusted for each optical disc, time required for adjusting write strategies may be greatly reduced.

Figure 3:
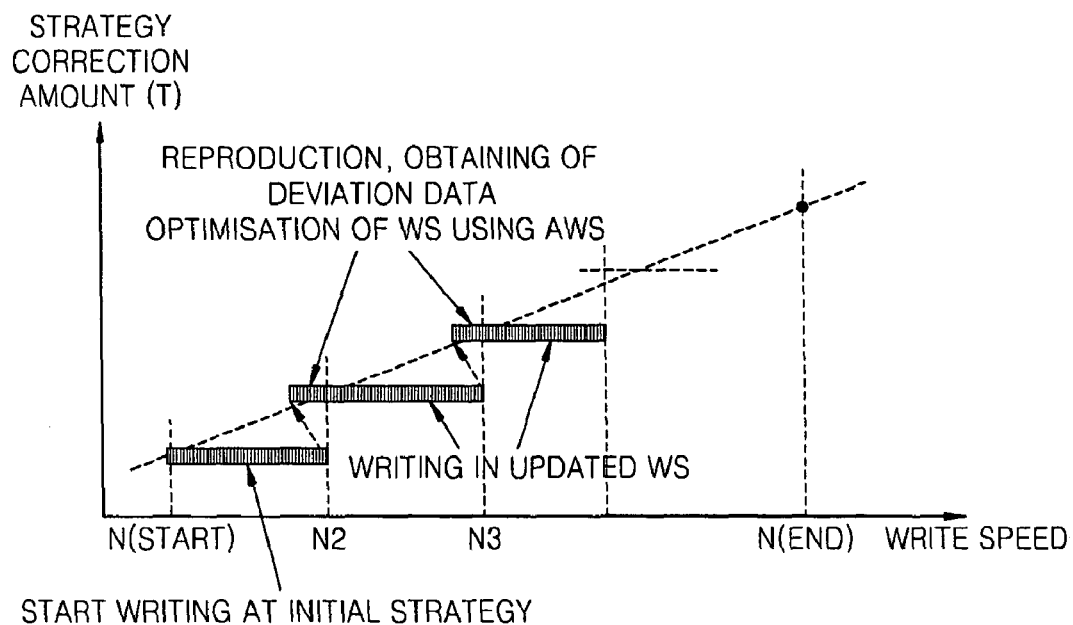
FIG. 3 illustrates a conceptual graph for explaining an operation of the optical disc apparatus according to an embodiment of the present invention.

FIG. 3 illustrates a conceptual graph of a case where a CAV write operation, in which a write speed is continuously changed, is performed according to an embodiment of the present invention. In other words, FIG. 3 illustrates a conceptual graph explaining an operation of performing AWS in each write strategy change position (speed) according to an embodiment of the present invention. FIG. 3 shows the result of performing AWS up to speed of N1, N2, N3 . . . , and N(end) from N(start) of writing start when a longitudinal axis represents a correction amount T of a write strategy and a latitudinal axis represents a write speed. That is, when the write speed is between N(start) and N2, the write operation may be performed with initial write strategy information, and, when the write speed is N2, e.g., when the write speed returns to about 1-track, write content may be reproduced, a deviation thereof may be calculated, AWS may be performed and optimization (correction) of write strategies may be performed. When the write speed is between N2 and N3, the write operation may be performed using the corrected write strategy. Subsequently, similarly, when the write speed exceeds a predetermined write speed, the write operation may be temporarily stopped, AWS may be performed, and write strategies may be corrected.

Figure 4:
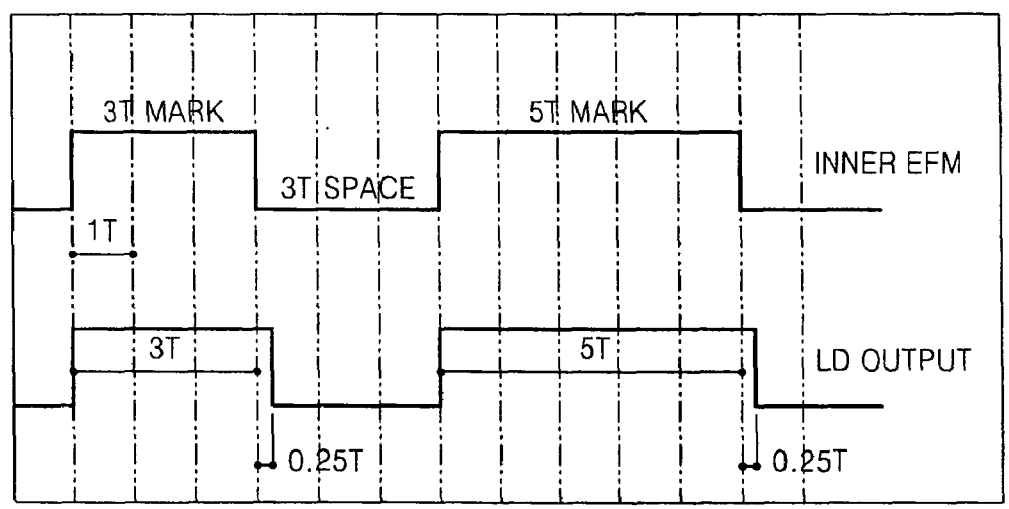
FIG. 4 illustrates an example of a reference write strategy according to an embodiment of the present invention.
Figure 5:
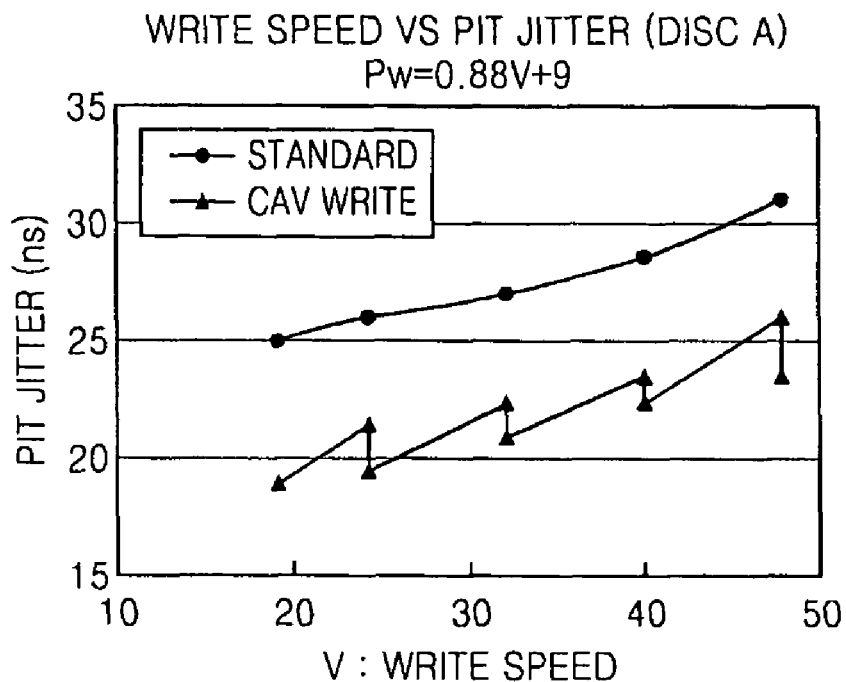
FIG. 5 illustrates a graph of a difference in jitter values for a disc A when a write operation is performed using a reference write strategy and when an embodiment of the present invention is applied.
Figure 6:
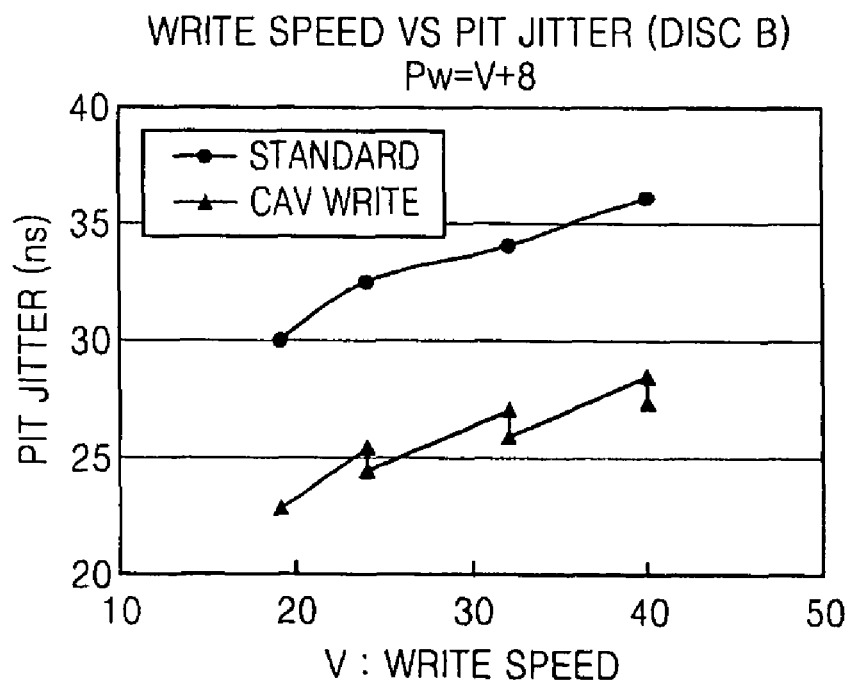
FIG. 6 illustrates a graph of a difference in jitter values for a disc B when a write operation is performed using a reference write strategy and when an embodiment of the present invention is applied.
Figure 7:
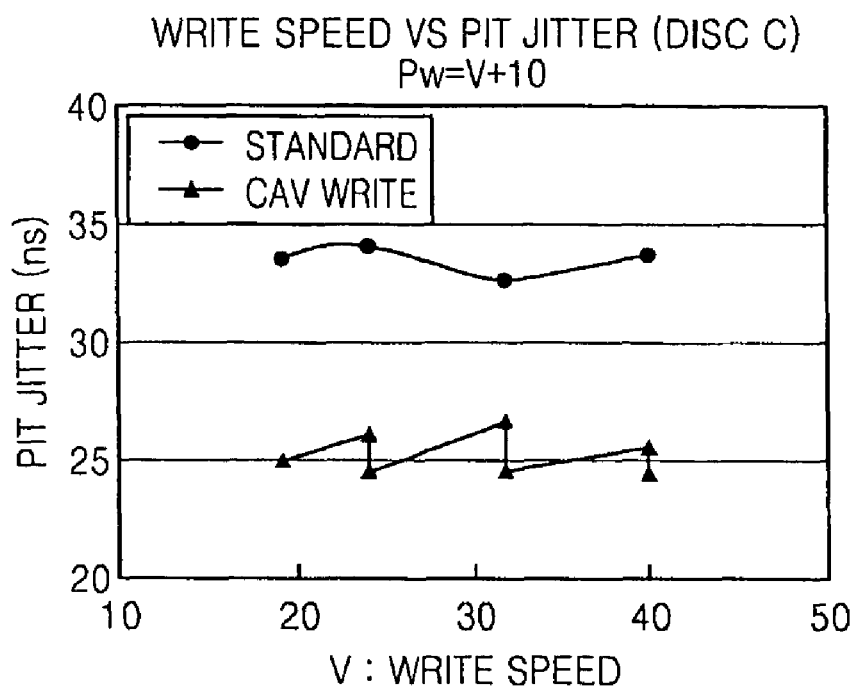
FIG. 7 illustrates a graph of a difference in jitter values for a disc C when a write operation is performed using a reference write strategy and when an embodiment of the present invention is applied.
Figure 8:
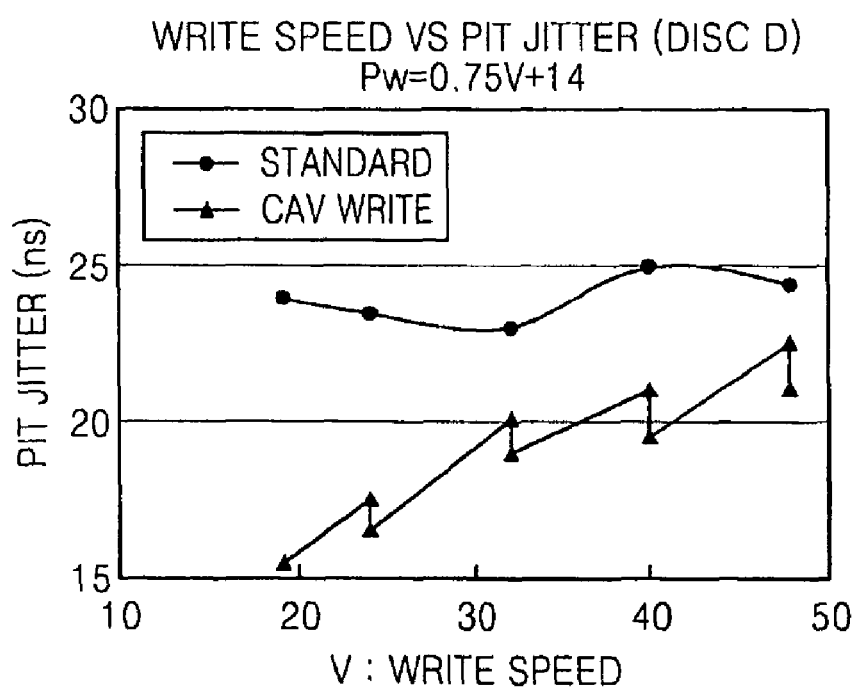
FIG. 8 illustrates a graph of a difference in jitter values for a disc D when a write operation is performed using a reference write strategy and when an embodiment of the present invention is applied.
Figure 9:
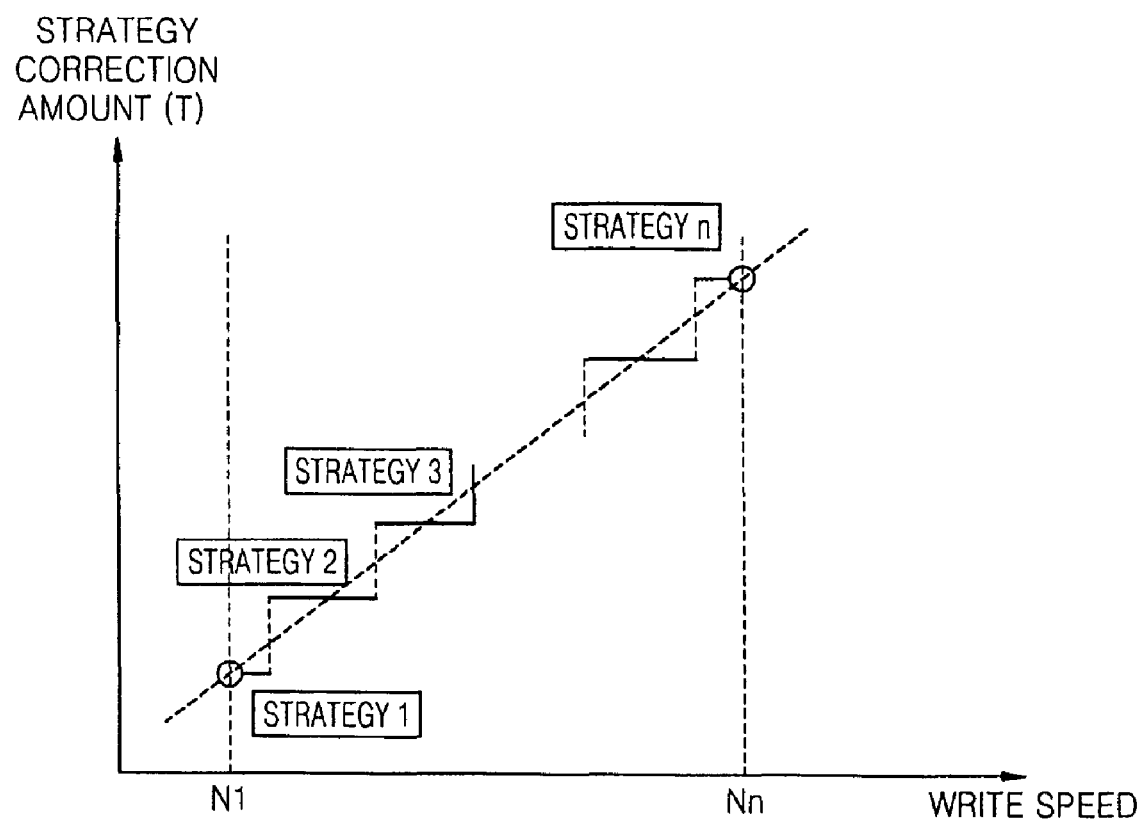
FIG. 9 illustrates a conceptual graph of the update state of a write strategy during a conventional CAV write operation.

FIG. 4 illustrates a schematic diagram of a reference write strategy when a mark of a laser diode is expanded by 0.25T. FIGS. 5 through 8 illustrate graphs for comparing the case where a write operation is performed using the reference write strategy illustrated in FIG. 4 with the case where a write operation is performed according to an embodiment of the present invention (CAV write) for four different types of CD-R discs, i.e., Disc A, Disc B, Disc C, and Disc D (standard), respectively. In this case, in FIGS. 5 through 8, a longitudinal axis represents pit jitter and a latitudinal axis represents a write speed V. As can be seen in the drawing figures, a good jitter value may be obtained by any of the discs by applying an embodiment of the present invention.

In addition, in FIGS. 5 through 8, a change speed of write strategies may be set to equal 8× intervals (16× 24× 32× 40× 48×), but may be set to equal 4× intervals or unequal intervals. In addition, for example, when a correction amount of write strategies is large, change speed intervals may be small. While four different types of CD-R discs are used in FIGS. 5 through 8, the present invention is not limited to a CD-R disc, but may be applied to, e.g., a CD-RW, DVD±R, DVD±RW, DVD-RAM or blue-ray disc.

As described above, in the optical disc apparatus according to embodiments of the present invention, optimum write strategy information contained in each optical disc may be obtained by using only minimum write strategy information, such that write strategy information does not need to be set by performing optimization of write strategies in each optical disc as is conventionally needed, and a time required for setting write strategies and the number of processes may be remarkably reduced.

In addition, in the optical disc apparatus according to embodiments of the present invention, new write strategy information does not need to be added whenever a new optical disc is produced, thus significantly reducing a memory capacity required to store write strategies.

Furthermore, in the optical disc apparatus according to embodiments of the present invention, information may be written to the optical disc using optimum write strategy information even when an optical disc cannot be identified, an entity error of the optical disc occurs or other operating environmental conditions are altered.

Exemplary embodiments of the present invention have been disclosed herein, and although specific terms are employed, they are used and are to be interpreted in a generic and descriptive sense only and not for purpose of limitation. For example, correcting of a write strategy of the present invention may be implemented in firmware or software, e.g., by an article of manufacture having a machine-accessible medium including data that, when accessed by a machine, cause the machine to generate compensation strategies in accordance with methods of the present invention. Accordingly, it will be understood by those of ordinary skill in the art that various changes in form and details may be made without departing from the spirit and scope of the present invention as set forth in the following claims.

What is claimed is:

1. An optical disc apparatus for writing information to an optical disc by forming a mark and a space on the optical disc, the optical disc apparatus comprising:
    a write stopping unit for temporarily stopping writing of information to the optical disc at a predetermined time;
    a deviation calculating unit for obtaining a deviation value of written information just before writing of information is stopped by the write stopping unit; and
    a write strategy correcting unit correcting a write strategy based on the deviation and a previously-stored inherent variation, wherein:
    writing of information to the optical disc restarts using the corrected write strategy,
    the correcting of the write strategy is performed a plurality of times from write start to write end, and
    times in the plurality of times are evenly spaced by an integer multiple of a minimum resolving power.

2. The optical disc apparatus as claimed in claim 1, wherein the predetermined time is determined based on a change of a write speed.

3. The optical disc apparatus as claimed in claim 1, further comprising a memory unit storing a reference write strategy and the inherent variation, wherein:
    an optimum reference write strategy on the optical disc, to which information is written, is selected and a write attempt is made in a test region of the optical disc,
    the deviation calculating unit calculates a deviation value of the result of the write attempt, and
    the write strategy correcting unit corrects a write strategy based on the calculated deviation value and the inherent variation.

4. The optical disc apparatus as claimed in claim 3, wherein writing according to the corrected write strategy to the optical disc is performed after the correction is performed.

5. The optical disc apparatus as claimed in claim 3, wherein, whether a test region is in an inner circumference test region or an outer circumference test region is determined according to a write start position from which a write operation starts.

6. A method for writing information to an optical disc by forming a mark and a space on the optical disc, the method comprising:
    performing a write operation using a reference write strategy in a test region of the optical disc before information is written to the optical disc, reproducing the written signal and correcting the reference write strategy;
    writing information to the optical disc using the corrected write strategy;
    when a write strategy position changes, temporarily stopping writing of information and optimizing the write strategy; and
    restarting writing of information using the optimized write strategy, wherein:
    the correcting of the write strategy is performed a plurality of times from write start to write end, and
    times in the plurality of times are evenly spaced by an integer multiple of a minimum resolving power.

7. The method as claimed in claim 6, wherein the method is applied to a writing method by which a write speed changes continuously.

8. The method as claimed in claim 6, wherein the optimizing of the write strategy comprises:
    reproducing written information just before the change position is formed; and
    obtaining a deviation value by optimizing the write strategy based on the obtained deviation value and previously-stored inherent variation.

9. The method as claimed in claim 6, wherein the temporarily stopping is at a predetermined time based on a change of write speed.

10. An article of manufacture having a machine-accessible medium including data that, when accessed by a machine, cause the machine to perform a method of optimizing a write strategy for writing to an optical disk, the method comprising:
    performing a write operation using a reference write strategy in a test region of the optical disc before information is written to the optical disc, reproducing the written signal and correcting the reference write strategy;
    writing information to the optical disc using the corrected write strategy;
    when a write strategy position changes, temporarily stopping writing of information and optimizing the write strategy; and
    restarting writing of information using the optimized write strategy, wherein:
    the correcting of the write strategy is performed a plurality of times from write start to write end, and
    times in the plurality of times are evenly spaced by an integer multiple of a minimum resolving power.

11. The article of manufacture as claimed in claim 10, wherein the optimizing of the write strategy comprises:
    reproducing written information just before the change position is formed; and
    obtaining a deviation value by optimizing the write strategy based on the obtained deviation value and previously-stored inherent variation.

* * * * *